United States Patent

Ko

[11] Patent Number: 5,963,268
[45] Date of Patent: Oct. 5, 1999

[54] SEMI-WIDE VIEW DISPLAY METHOD AND DEVICE USING THE SAME

[75] Inventor: Dong-Jin Ko, Suwon, Rep. of Korea

[73] Assignee: Samsung Electronics Co., Ltd., Kyungki, Rep. of Korea

[21] Appl. No.: 08/536,197

[22] Filed: Sep. 29, 1995

[30] Foreign Application Priority Data

Sep. 30, 1994 [KR] Rep. of Korea ............ 94-25094

[51] Int. Cl.$^6$ ............................................. H04N 5/46
[52] U.S. Cl. ................ 348/556; 348/542; 348/545; 348/554; 348/555; 348/556; 345/121
[58] Field of Search ................... 348/556, 580, 348/581, 445, 325, 913, 555, 557, 558, 542, 543, 545, 554; 345/12, 14; H04N 5/46, 3/27

[56] References Cited

U.S. PATENT DOCUMENTS

| | | | |
|---|---|---|---|
| 4,394,690 | 7/1983 | Kobayashi | 358/180 |
| 4,439,714 | 3/1984 | Nakamura et al. | 315/371 |
| 4,475,124 | 10/1984 | Ankeny et al. | 358/183 |
| 4,837,626 | 6/1989 | Nishiyama et al. | 358/183 |
| 4,872,054 | 10/1989 | Gray | 348/500 |
| 4,878,117 | 10/1989 | Ikehira et al. | 348/565 |
| 4,962,427 | 10/1990 | Lunn et al. | 348/555 |
| 4,962,428 | 10/1990 | Tong et al. | 348/558 |
| 5,068,732 | 11/1991 | Satoh | 358/180 |
| 5,126,639 | 6/1992 | Srivastava | 348/555 |
| 5,168,362 | 12/1992 | Yoshida | 348/445 |
| 5,220,423 | 6/1993 | Chikuma | 358/140 |
| 5,262,864 | 11/1993 | Saeger et al. | 348/561 |
| 5,287,042 | 2/1994 | Materl | 315/370 |
| 5,347,318 | 9/1994 | Kobayashi et al. | 348/558 |
| 5,450,129 | 9/1995 | Matoba et al. | 348/294 |
| 5,467,142 | 11/1995 | Ichinokawa | 348/556 |
| 5,486,868 | 1/1996 | Shyu et al. | 348/524 |
| 5,486,870 | 1/1996 | Decreamer | 348/556 |
| 5,617,147 | 4/1997 | Bzaki | 348/461 |

FOREIGN PATENT DOCUMENTS 6181552  6/1994  Japan .

Primary Examiner—John K. Peng
Assistant Examiner—Linus H. Lo
Attorney, Agent, or Firm—Sughrue, Mion, Zinn, Macpeak & Seas, PLLC

[57] ABSTRACT

A semi-wide view display method and device using the same are provided with a semi-wide view function for arbitrarily converting an aspect ratio of a screen in a television. The method includes the steps of setting a display mode according to a user-selected aspect ratio of a television screen; receiving vertical and horizontal blanking pulses, controlling the width of the blanking pulse according to the display mode setting, and outputting the result; generating a television signal which is displayed on the screen and a blanking signal which is not displayed on the screen by inputting the generated blanking pulse; and displaying the television and the blanking signal to thereby control vertical/horizontal over-scanning and vertically lengthen a blanking period, in order to convert the aspect ratio of the displayed image.

7 Claims, 3 Drawing Sheets

FIG. 3A
FIG. 3B
FIG. 3C
WIDE VISION MODE OFF | WIDE VISION MODE ON
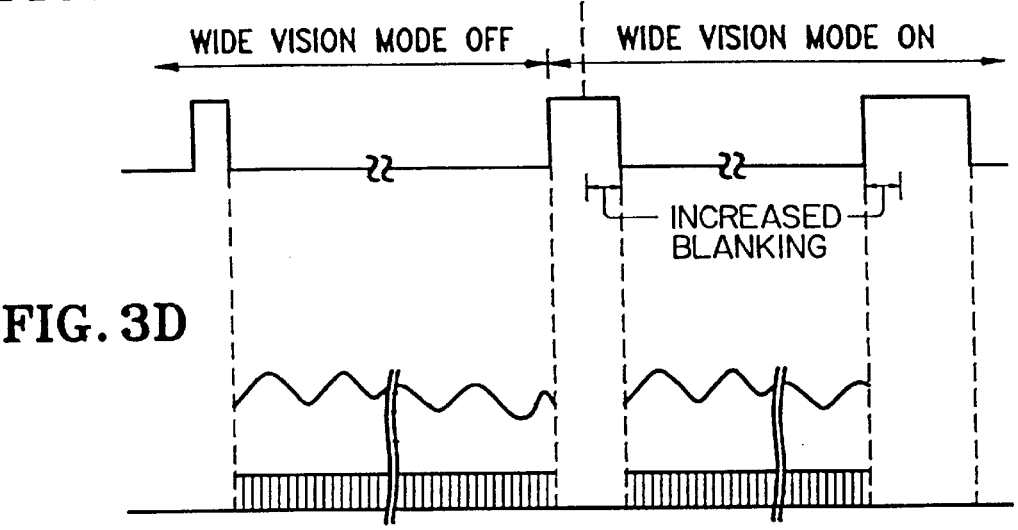
—INCREASED BLANKING—
FIG. 3D

BLANKING

SEMI-WIDE VIEW DISPLAY METHOD AND DEVICE USING THE SAME

BACKGROUND OF THE INVENTION

The present invention relates to a semi-wide view display method and a device, and more particularly, to a semi-wide view display method and a device for arbitrarily changing an aspect ratio of a display screen in a conventional television.

An image display screen in a conventional television has an aspect ratio of 4:3. However, it is known that the human eye is less fatigued by watching a screen having an aspect ratio of 16:9. Further, a television screen having an aspect ratio of 4:3 provides less ambience than a wide screen, e.g., one having an aspect ratio of 16:9.

SUMMARY OF THE INVENTION

It is an object of the present invention to provide a semi-wide view display method and device for changing an aspect ratio of 4:3 of a display screen in a conventional television to an aspect ratio of 16:9 according to a user's selection.

To accomplish the above object, there is provided a semi-wide view display method comprising the steps of: (a) setting a display mode according to a user-selected aspect ratio of a television screen; (b) receiving vertical and horizontal blanking pulses, controlling the width of the blanking pulse according to the display mode setting, and outputting the result; (c) generating a television signal which is displayed on the screen and a blanking signal which is not displayed on the screen by inputting said generated blanking pulse; and (d) displaying the television signal and the blanking signal processed in the step (c).

To accomplish the above object, there is provided a semi-wide view display comprising: a mode selector for setting a display mode according to a user-selected aspect ratio of a television screen; a blanking pulse generator for receiving vertical and horizontal blanking pulses, controlling a blanking pulse width according to the television display mode set by the mode selector, and outputting the result; a television/blanking signal generator for generating a television signal which is displayed on the screen and a blanking signal which is not displayed on the screen by inputting said generated blanking pulse; and a CRT for displaying the television signal and blanking signal processed by the television/blanking signal generator.

BRIEF DESCRIPTION OF THE DRAWINGS

The above objects and other advantages of the present invention will become more apparent by describing in detail a preferred embodiment thereof with reference to the attached drawings in which:

FIG. 3A to FIG. 3D illustrate signals of each portion of the television shown in FIG. 1.

DETAILED DESCRIPTION OF THE INVENTION

Figure 1:
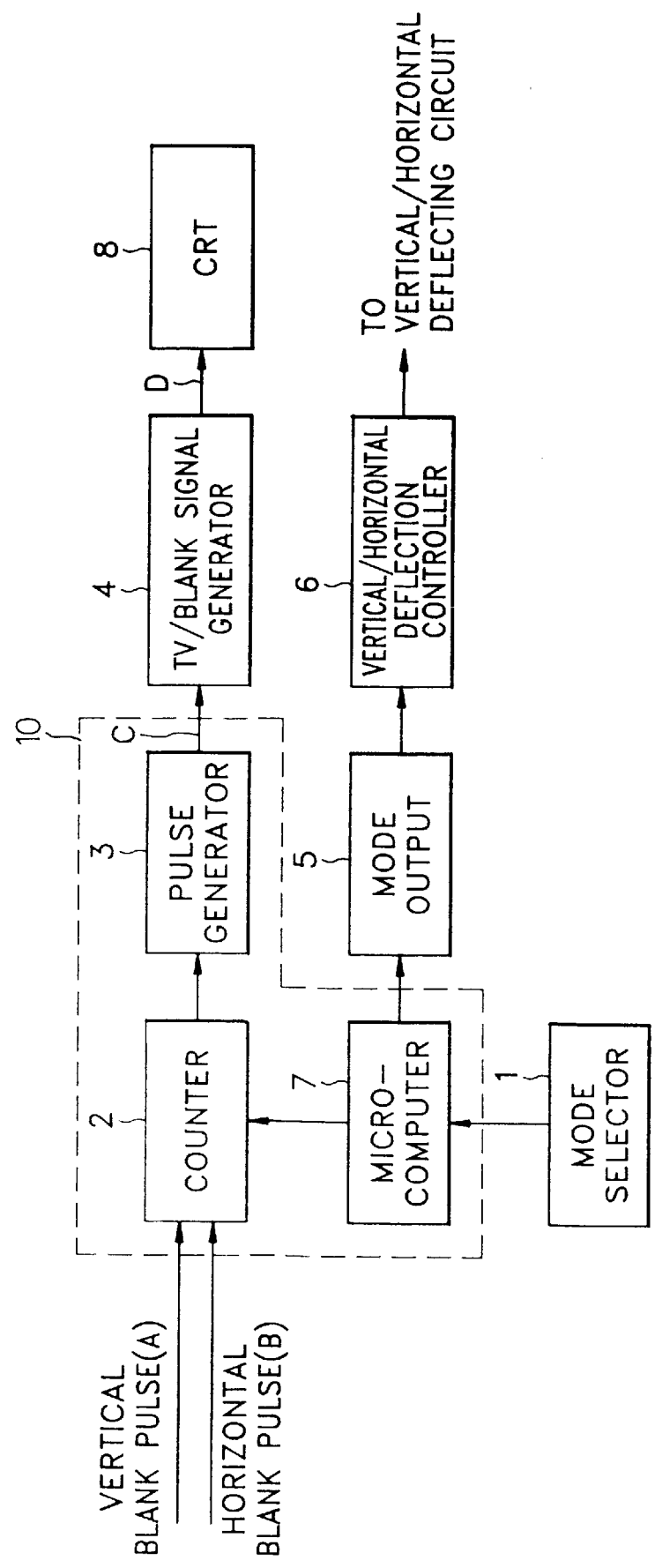
FIG. 1 is a block diagram showing a television having a semi-wide view function of the present invention.

FIG. 1 is a block diagram showing a device for providing a semi-wide view display of the present invention. The device shown in FIG. 1 comprises a mode selector 1 for setting a display mode according to an aspect ratio of a television screen, a counter 2 for receiving vertical and horizontal blanking pulses according to a predetermined control signal and counting a predetermined number of the horizontal blanking pulses, a pulse generator 3 for outputting a predetermined blanking pulse according to an output of counter 2, a television/blanking signal generator 4 for converting a television image signal into a television signal and a blanking signal according to the blanking pulse output from pulse generator 3, a mode output 5 for outputting a predetermined signal according to a display mode of a television, a vertical/horizontal deflection controller 6 for controlling the vertical and horizontal size of the image displayed according to an output signal of mode selector 1, and a microcomputer 7 for controlling counter 2 and mode output 5 according to an output of mode selector 1. Control signal generator 10 is made up of controlling counter 2, pulse generator 3 and microcomputer 7.

Figure 2:
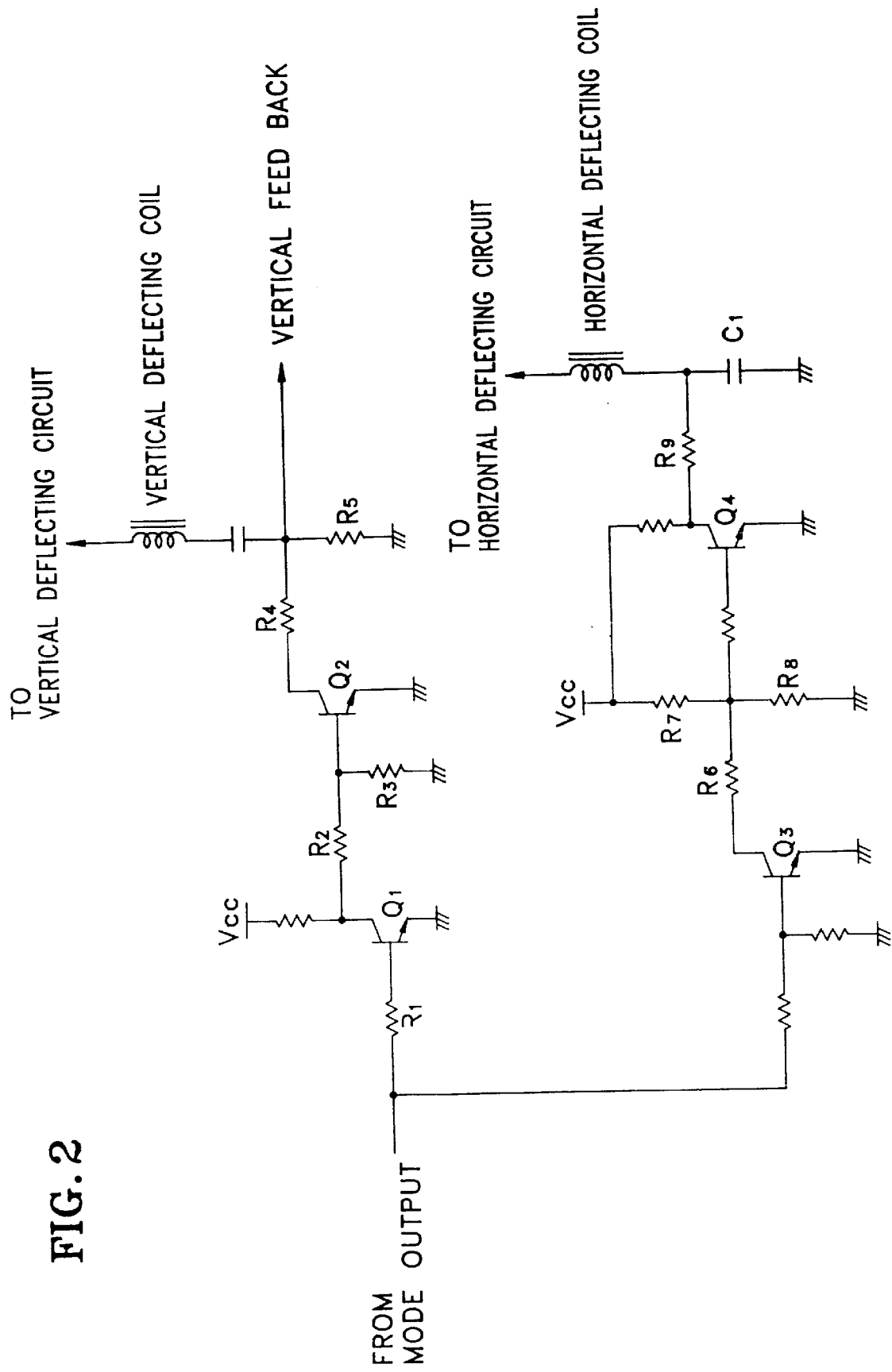
FIG. 2 is a detailed circuit diagram showing the vertical/horizontal deflection controller of FIG. 1.

FIG. 2 is a detailed diagram showing the vertical/horizontal deflection controller shown in FIG. 1. Vertical/horizontal deflection controller 6 receives the signal output from mode output 5, controls the vertical/horizontal size of the displayed image, and outputs the result to the vertical/horizontal deflecting circuit.

FIG. 3A to FIG. 3D illustrate signals of each portion of the television shown in FIG. 1.

An embodiment of the present invention will be explained with reference to FIGS. 1, 2 and 3A–3D.

When a display mode is set by mode selector 1 of FIG. 1 according to an aspect ratio of the screen displayed onto a television, an output of mode selector 1 is input to microcomputer 7. Then, microcomputer 7 recognizes the display mode of the television and outputs a signal for controlling counter 2 and mode output 5.

Here, counter 2 receives vertical and horizontal blanking pulses A and B of a television image signal and counts a predetermined number of horizontal blanking pulses B based on vertical blanking pulse A according to the control signal provided by microcomputer 7. FIG. 3A illustrates vertical blanking pulse A input to counter 2 while FIG. 3B illustrates horizontal blanking pulse B.

Counter 2 starts counting the horizontal blanking pulses from the time a falling edge of the vertical blanking pulse shown in FIG. 3A is recognized and stops counting when the horizontal blanking pulse reaches a predetermined number. An output of pulse generator 3 maintains a "high" logic level during counting. An output of pulse generator 3 is lowered to "low" logic level when the predetermined number of horizontal blanking pulses has been counted. At the same time, counter 2 is reset and begins again to count the horizontal blanking pulse. During this counting operation, an output of pulse generator 3 is maintained at a "low" logic level. The above operation is repeated for every field of a television image signal, to thereby generate a blanking pulse.

FIG. 3C illustrates the blanking pulse that corresponds to reference designation C of FIG. 1. In the semi-wide mode, blanking pulse C output from pulse generator 3 is wider than vertical blanking pulse A input to counter 2.

The blanking pulse output from pulse generator 3 is input to television/blanking signal generator 4. Then, a television signal for displaying a television image and a blanking signal for generating a blank onto a television screen are generated and output to a CRT 8.

FIG. 3D illustrates a television image signal, i.e., reference designation D of FIG. 1, processed by television/blanking signal generator 4.

A semi-wide mode is a display mode by which an aspect ratio of the screen displayed onto a television is converted into 16:9. When the semi-wide mode is selected by mode selector 1, the number of horizontal blanking pulses counted by counter 2 while an output of pulse generator 3 is at a "high" logic level is approximately 39. In addition, the number of horizontal blanking pulses counted by counter 2 while an output of pulse generator 3 in at a "low" logic level is approximately 156. The counted number is controlled by microcomputer 7 according to a display mode.

Mode output 5 outputs a predetermined signal to vertical/horizontal deflection controller 6 according to a display mode of a television, to thereby control the vertical/horizontal size of the image displayed onto a television. A logic level "low" is output at a normal mode and a logic level "high" is output when a semi-wide mode is set.

FIG. 2 is a detailed circuit diagram of vertical/horizontal deflection controller 6 shown in FIG. 1. In a normal mode, a logic level "low" is applied to the base of transistor Q1 so as to open transistor Q1, and a logic level "high" is applied to a base of transistor Q2 so as to turn on transistor Q2. Thus, a vertical AC gain feedback resistance value becomes a parallel resistance value of resistors R4 and R5 (R4//R5). Here, a vertical size of the image displayed onto a television is controlled according to the current flowing through a vertical deflecting coil.

When a semi-wide mode is set, a "high" output from mode output 5 is applied to the base of transistor Q1 so as to turn on transistor Q1 and open transistor Q2. Thus, the vertical AC gain feedback resistance value becomes R5, which is larger than the feedback resistance value R4//R5 at a normal mode. Accordingly, the current flowing through the vertical deflecting coil is decreased and the vertical size of the image displayed onto is a television is reduced.

In addition, when logic level "high" is input to the base of transistor Q3 so as to turn on transistor Q3, a DC bias voltage of a side pin cushion transistor Q4 consisting of resistors R6, R7 and R8 is lowered, to thereby increase the collector voltage of transistor Q4. Moreover, a DC voltage of capacitor C1 is increased via resistor R9 and the overall gain of a horizontal side pin cushion is increased. Therefore, the current flowing through the horizontal deflecting coil decreases and the horizontal size of the image displayed onto a television is reduced.

Accordingly, the blanking pulse is widened by pulse generator 3, and the horizontal size and vertical size of the screen displayed onto a television is reduced by vertical/horizontal deflection controller 6, to thereby reduce horizontal over-scanning. In addition, vertical over-scanning is widened by a blanking pulse and an aspect ratio of an image displayed onto a television can be converted into 16:9.

Figure 4A:
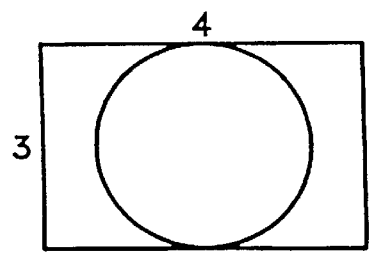
FIG. 4A and FIG. 4B illustrate a normal screen having an aspect ratio of 4:3 in the image displayed onto a television, and a semi-wide screen where an aspect ratio of a screen is converted into 16:9 when a semi-wide mode is set, respectively.
Figure 4B:
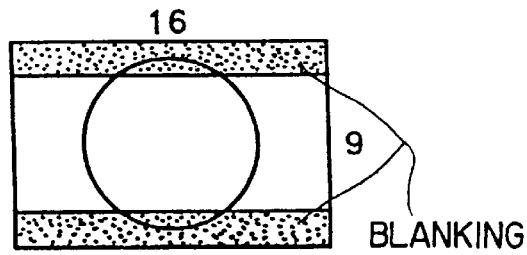

FIG. 4A and FIG. 4B illustrate a normal screen having an aspect ratio of 4:3 in the image displayed onto a television, and a semi-wide screen where the aspect ratio of a screen is converted into 16:9 when a semi-wide mode is set, respectively.

As described above, a television having a semi-wide view function of the present invention enables vertical and horizontal over-scanning to be controlled. Further, a blank period is vertically elongated, to thereby convert the aspect ratio of the image displayed onto a television.

What is claimed is:

1. A semi-wide view display comprising:
a mode selector for setting a display mode according to a user-selected aspect ratio of a television screen;
a blanking pulse generator for receiving vertical blanking pulses and horizontal blanking pulses from a television image signal, and generating a blanking pulse having a width which is determined according to the display mode set by said mode selector and the received vertical blanking pulses and horizontal blanking pulses;
a television/blanking signal generator for generating a television signal which is displayed on the television screen and a blanking signal which is not displayed on the television screen by inputting said generated blanking pulse; and
a CRT for displaying an image according to the television signal and blanking signal processed by said television/blanking signal generator, wherein said blanking pulse generator comprises:
a counter for counting predetermined numbers of said horizontal blanking pulses based on said vertical blanking pulses according to a predetermined control signal;
a pulse generator for outputting a predetermined pulse according to an output of said counter; and
a microcomputer for controlling said counter according to an output of said mode selector.

2. A semi-wide view display according to claim 1, wherein:
a first of the predetermined numbers of said horizontal blanking pulses is counted from a falling edge of one of said vertical blanking pulses;
said counter counts a second of the predetermined numbers of said horizontal blanking pulses starting from a falling edge of a second of said vertical blanking pulses; and
the width of said blanking pulse is established based on said first predetermined number and said second predetermined number.

3. A semi-wide view display according to claim 2, wherein said first predetermined number is a sum of a third predetermined number of said horizontal blanking pulses following the falling edge of said first vertical blanking pulse and a fourth predetermined number of said horizontal blanking pulses following said third predetermined number of said horizontal blanking pulses.

4. A semi-wide view display, comprising:
a mode selector for setting a display mode according to a user-selected aspect ratio of a television screen;
a blanking pulse generator for receiving vertical blanking pulses and horizontal blanking pulses from a television image signal, and generating a blanking pulse having a width which is determined according to the display mode set by said mode selector and the received vertical blanking pulses and horizontal blanking pulses;
a television/blanking signal generator for generating a television signal which is displayed on the television screen and a blanking signal which is not displayed on the television screen by inputting said generated blanking pulse;
a CRT for displaying an image according to the television signal and blanking signal processed by said television/blanking signal generator;
a mode output means for outputting a predetermined signal according to the display mode set by said mode selector; and
a vertical/horizontal deflection controlling means for controlling vertical and horizontal size of the image displayed onto said CRT according to an output of said mode output means.

5. A semi-wide view display according to claim 4, wherein said vertical/horizontal deflection controller comprises:

a vertical deflection control circuit for controlling vertical size of the image displayed onto said CRT by means of increasing a vertical AC gain feedback and decreasing a current flowing through a vertical deflecting coil when a semi-wide view display mode is set by said mode selector; and a horizontal deflection control circuit for controlling horizontal size of the image displayed onto said CRT by means of increasing an overall gain of a horizontal side pin cushion and decreasing a current flowing through a horizontal deflecting coil when a semi-wide view display mode is set by said mode selector.

6. A semi-wide view display method comprising the steps of:

(a) setting a display mode according to a user-selected aspect ratio of a television screen;

(b) receiving vertical blanking pulses and horizontal blanking pulses from a television image signal, and generating a blanking pulse having a width which is controlled according to the display mode setting and the received vertical blanking pulses and horizontal blanking pulses;

(c) generating a television signal which is displayed on the television screen and a blanking signal which is not displayed on the television screen by inputting said generated blanking pulse; and (d) displaying the television signal and the blanking signal processed in the step (c), wherein said blanking pulse is generated by:

(b1) counting a first predetermined number of said horizontal blanking pulses after a falling edge of a first of said vertical blanking pulses;

(b2) counting a second predetermined number of said horizontal blanking pulses after a falling edge of a second of said vertical blanking pulses, said second vertical blanking pulse following said first vertical blanking pulse; and (b3) establishing the width of said blanking pulse according to said steps (b1) and (b2) above.

7. A semi-wide view display method according to claim 6, wherein said first predetermined number is a sum of a third predetermined number of said horizontal blanking pulses following the falling edge of said first vertical blanking pulse and a fourth predetermined number of said horizontal blanking pulses following said third predetermined number of said horizontal blanking pulses.

* * * * *